G. Palmer.
Nut Lock.
N° 90,867. Patented Jan. 1, 1869.

Witnesses.
Harry King.
F. A. Lehmann.

Inventor
Geo. Palmer.
per
Alexander & Mason
attys.

United States Patent Office.

GEORGE PALMER, OF LITTLESTOWN, PENNSYLVANIA.

Letters Patent No. 90,867, dated June 1, 1869.

IMPROVEMENT IN NUT-LOCK.

The Schedule referred to in these Letters Patent and making part of the same.

*To all whom it may concern:*

Be it known that I, GEORGE PALMER, of Littlestown, in the county of Adams, and in the State of Pennsylvania, have invented certain new and useful Improvements in Nut-Locks; and do hereby declare that the following is a full, clear, and exact description thereof, reference being had to the accompanying drawings, and to the letters of reference marked thereon, making a part of this specification.

The nature of my invention consists in the manner of securing nuts and bolts upon either metallic or wooden surfaces, in a cheap, simple, and effective manner, without the use of pins or other fastenings.

Letter A represents a bar, through which there is a number of bolts passing, secured upon the top by the means of nuts.

These nuts are locked in several ways. They are first screwed down upon the bolt, and then their exact forms and positions are marked off upon the surface by any suitable tool or device. They are then turned partly back so as to expose the surface where the corners are to rest, and then there is a small opening chipped in the surface at these points. The nut is again placed in position, when the corners are mashed or punched downwards, so as to fill these cavities, by any suitable tool. Or, instead of these small holes, I cut small grooves, as seen at the joint B, running in different directions across the surface, under the nut, when the nut can be locked both upon the corners and sides. Should the nut be so large as to extend over the sides of the surface, the lower rim of the nut can be mashed down, or small projections cut, which will catch the side, and thus prevent it from turning.

The washers can be made adjustable, so as to slide back and forth with the nut.

This manner of locking the nuts is equally applicable to either wood or metal surfaces, and is the cheapest, simplest, and most effective manner yet invented.

A want of a similar fastening has long been felt, as all those heretofore have been either too costly and complicated, or else required too much trouble and time to secure them. But by my method there need be no additional parts, and they can be secured in a few moments.

Figure 1:
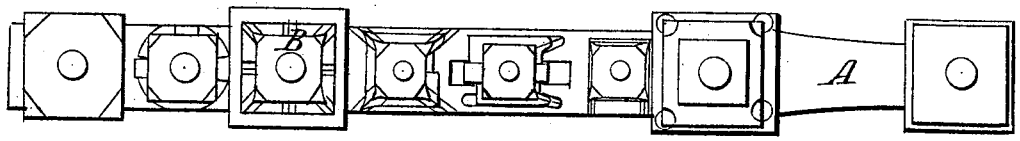
Figure 1 represents a plan view of either a wood or metal surface, upon which there is a number of nuts secured.
Figure 2:
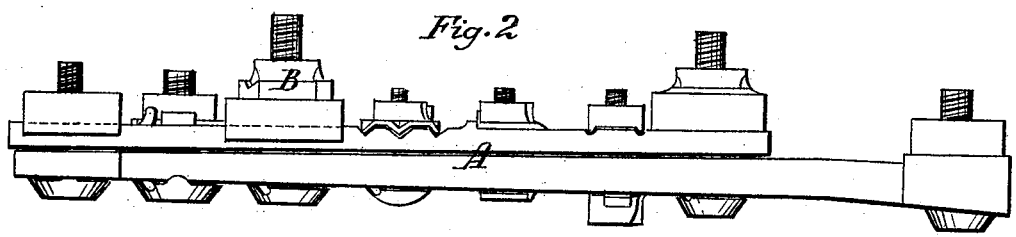
Figure 2 is a side view of the same.
Figure 3:
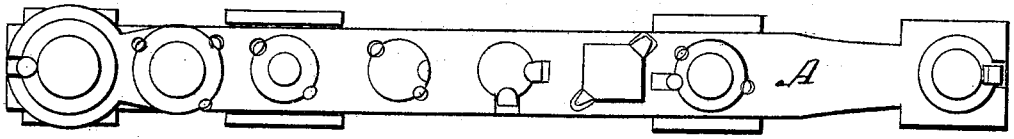
Figure 3 is a bottom view of the same, showing the manner in which the bolts are fastened.

When it is desired to lock bolts, so as to hold them in place, a small hole is punched in the surface by some pointed instrument, and then the sides of the head are mashed down similar to the nuts as seen in fig. 3.

In case the bolt, upon which the nut is secured, should be required to move in a slot, the washer can be secured to the nut in such a manner that it will slide freely with it, and at the same time serve as a lock.

Having thus described my invention,

What I claim, and desire to secure by Letters Patent, is—

1. Locking a nut upon the bed or washer, by forming a groove or cavity in the bed or washer, and mashing the corners of the nut into the grooves or cavities thus formed, substantially as herein set forth.

2. Locking nuts, when extending over the edge of the surface, by mashing down the lower rim, or cutting small projections upon the edge, so as to catch upon the side, substantially as set forth and described.

In testimony that I claim the foregoing, I have hereunto set my hand, this 14th day of May, 1869.

GEORGE PALMER.

Witnesses:
F. A. LEHMANN,
J. M. STOOPS.